Oct. 17, 1967  R. J. SCHROEDER  3,347,334
VEHICLE FRAME WITH BUILT-IN BATTERY COMPARTMENT
Original Filed Dec. 21, 1964  2 Sheets-Sheet 1

Inventor
Robert J. Schroeder
By Charles E. Schwab
Attorney

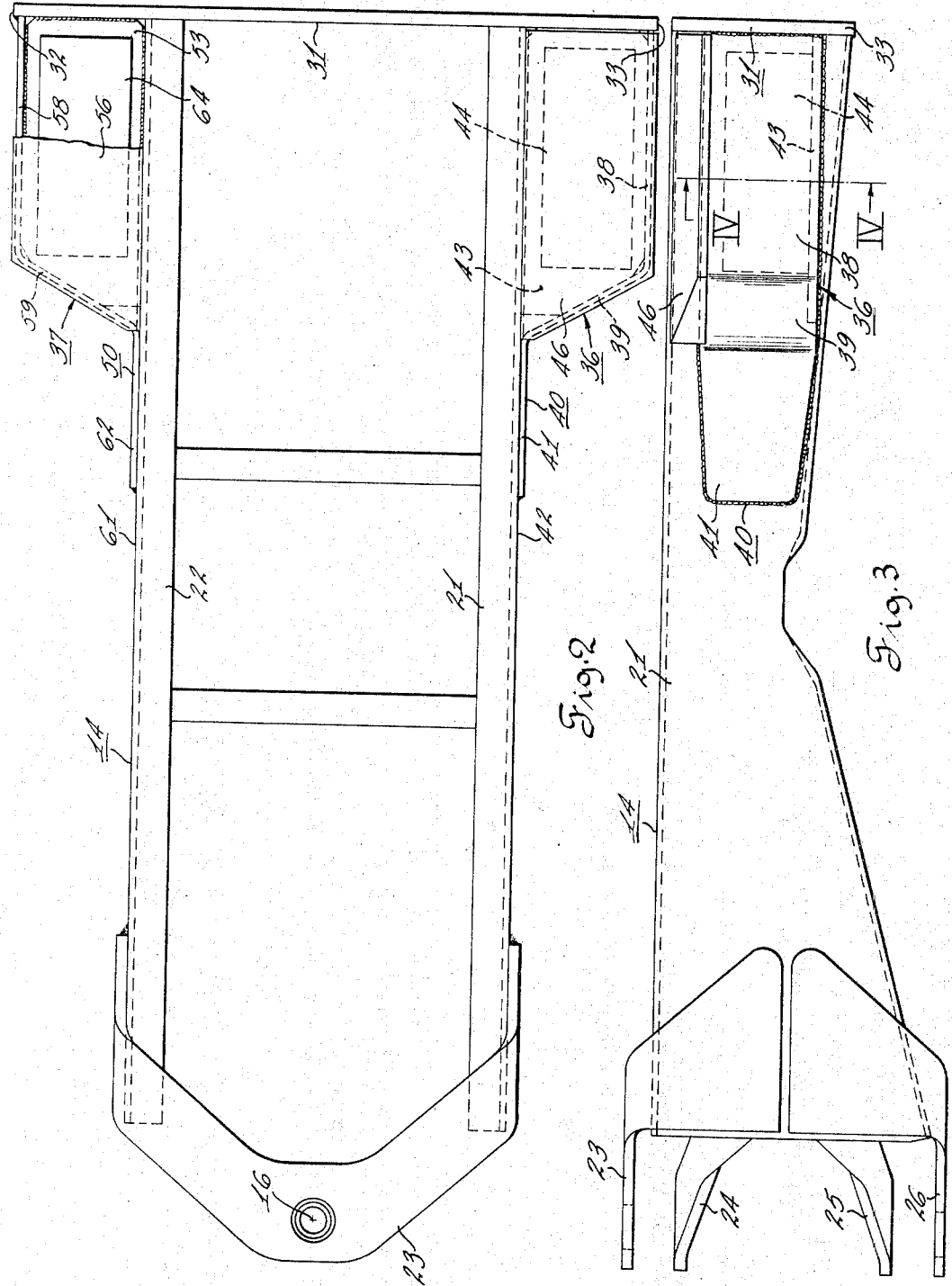

United States Patent Office 3,347,334
Patented Oct. 17, 1967

3,347,334
VEHICLE FRAME WITH BUILT-IN
BATTERY COMPARTMENT
Robert J. Schroeder, Deerfield, Ill., assignor to Allis-Chalmers Manufacturing Company, Milwaukee, Wis.
Continuation of application Ser. No. 419,688, Dec. 21, 1964. This application Sept. 16, 1966, Ser. No. 580,130
6 Claims. (Cl. 180—68.5)

This application is a continuation of my copending application Serial No. 419,688 filed Dec. 21, 1964.

This invention relates to a vehicle frame with a built-in battery compartment and particularly to a battery compartment having walls serving as reinforcement for the vehicle bumper or tool mounting plate.

Hertofore batteries for rubber tired motor vehicles have been placed at various points on the vehicle. On some rubber tired loaders, for instance, the battery or batteries are placed in a compartment directly behind the operator's seat. A disadvantage of such positioning of the battery is that maintenance personnel must climb up on the vehicle to inspect and service the battery. On other rubber tired loaders, the battery has been positioned centrally on the vehicle and thus the battery weight has not been used to full advantage as a counterweight for the front mounted bucket.

It is an object of this invention to provide a battery compartment, the side walls of which serve as reinforcing structure for a bumper or tool mounting plate.

It is a further object of this invention to provide a battery compartment which is at the rear end of a material handling vehicle whereby the battery serves effectively as counterweight for a tool at the other end of the vehicle.

It is a further object of this invention to provide a battery compartment as hereinbefore outlined which is at the side of the vehicle at a height permitting inspection and servicing by maintenance personnel without the necessity of their mounting the vehicle.

These and other objects and advantages of this invention will be apparent to those familiar with the art when the following description is read in conjunction with the drawings in which:

FIG. 2 is a top view of the rear frame of the loader shown in FIG. 1;

FIG. 3 is a side view of the frame shown in FIG 2; and

Figure 1:
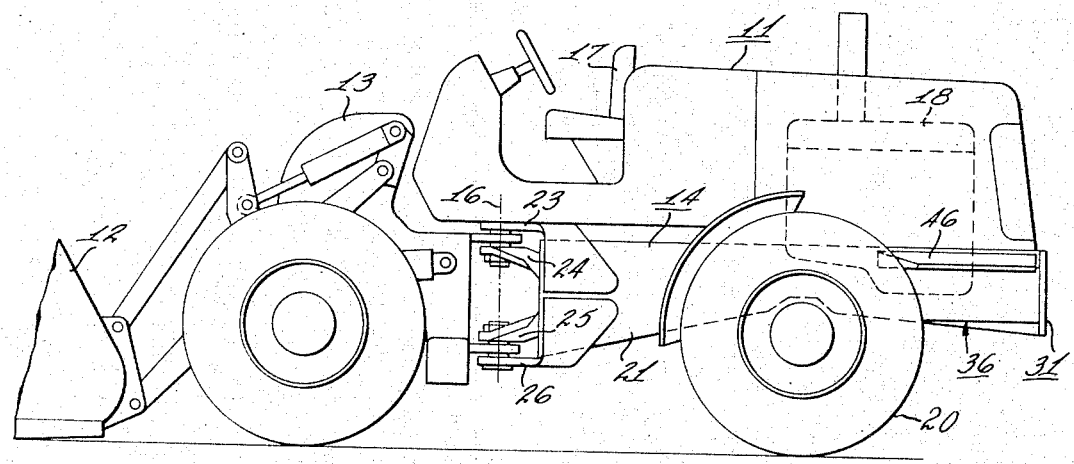
FIG. 1 is a side view of an articulated front end loader incorporating the present invention.
Figure 4:
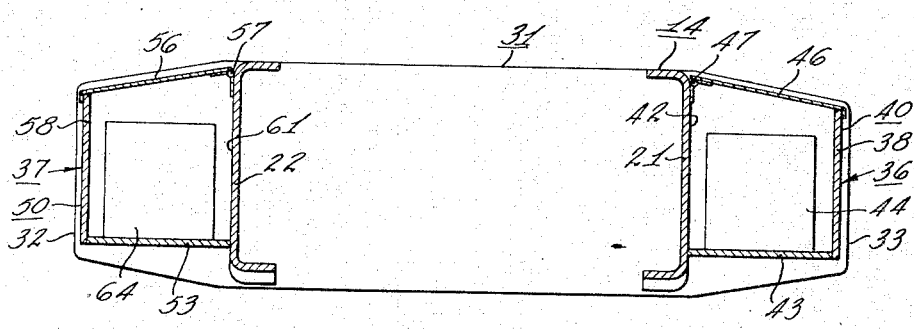
FIG. 4 is a section view taken along the line IV—IV in FIG. 3.

This invention is illustrated in a rubber tired articulated front end loader 11 having a material handling tool in the form of a front end bucket attachment 12. The loader has a front main frame 13 and rear main frame 14 pivotally connected for articulation about a vertical pivot axis 16. The rear main frame 14 supports the operator's compartment 17 and an engine 18 which drives at least the pair of rear wheels 20 through power transmitting means, not shown. As shown in FIGS. 2 and 4, the rear frame 14 includes a pair of longitudinally extending and transversely spaced frame members 21, 22 which support the engine 18 therebetween. The forward ends of frame members 21, 22 are rigidly interconnected by hinge components 23, 24, 25, 26. A bumper structure in the form of a vertically disposed and transversely extending plate 31 is rigidly secured as by welding to the rear ends of the frame members 21, 22 and as illustrated in FIGS. 2 and 4 the plate 31 extends transversely beyond the frame members 21, 22 terminating in substantially vertically disposed ends 32, 33. The portions of bumper 31 extending transversely outwardly beyond frame members 21, 22 form vertically disposed rear walls of battery receiving structures hereinafter described. The transversely extending plate 31 may be employed as a bumper or as a tool mounting plate.

A pair of combined bracing and battery receiving structures 36, 37 rigidly interconnect and brace the plate 31 and the frame members 21, 22 and are disposed rearwardly of the rear wheels 20. The battery compartment structure 36 includes a vertically disposed and longitudinally extending outer wall 38 and a transversely extending vertical front wall 39 which are a part of a formed plate 40 secured at its rear end to the outer end 33 of plate 31 by welding. The formed plate 40 has a bracing leg 41 secured as by welding to the transversely outward facing vertical side wall 42 of frame member 21. The battery compartment structure 36 also includes a bottom wall 43 rigidly interconnected by welding to the vertical bumper plate 31 and walls 38, 39, 42. A battery 44 is positioned within the battery compartment formed by the structure 36, bumper 31 and wall 42 and is releasably secured to the bottom plate 43 in a conventional manner by means not shown. A slanted roof cover 46 is pivotally mounted on the frame member 21 by a hinge 47 as shown in FIG. 4.

The battery compartment structure 37 is similarly made up of a bottom wall 53 and formed plate 50 which are identical to bottom wall 43 and plate 40 of battery compartment structure 36. A slanted roof top cover 56 is secured to frame member 22 by a piano hinge 57 as shown in FIG. 4. The longitudinally extending vertical portion 58 of formed plate 50 provides an outer wall of the battery compartment structure 37 and such portion is secured by welding to the vertically disposed end 32 of plate 31. Wall portion 59 of the formed plate 50 serves as a vertical front wall of the battery compartment structure 37. The bottom wall plate 53 is welded to bumper plate 31 and walls 58, 59 of formed plate 50 and also to the transversely outward facing vertical side wall 61 of frame member 22. Formed plate 50 has a forwardly extending bracing leg 62 which is secured by welding to the frame member 22.

A battery 64 equal in size to battery 44 is positioned in the battery compartment structure 37 and is releasably fastened to the bottom plate 53 by mounting means not shown. By positioning the batteries 44, 64 at the rear of the vehicle their weight is most advantageously used as counterbalance weight, which is particularly needed in material handling vehicles such as a front end loader in which the present invention is illustrated. The batteries may weigh 130 pounds each or more and thus the cost of providing counterweight material of 260 pounds or more is eliminated. Additionally the positioning of the batteries in close proximity to the engine 18 reduces the length of electric lines to the engine with attendant reduced cost and power loss. The covers of the battery compartment are between waist and chest height and thus are at a convenient height for personnel checking and servicing the batteries 44, 64. Further the batteries are not hidden within the vehicle where they would be less accessible, nor are they so positioned that vehicle attachments would hinder their replacement or servicing.

The embodiments of the invention for which an exclusive property or privilege is claimed are defined as follows:

1. In a vehicle of the type having a material handling tool at its front end and an engine near its rear end the combination comprising:

a pair of longitudinally extending and transversely spaced frame members supporting said engine therebetween and having transversely outward facing vertical side walls, respectively, a vertically disposed and transversely extending plate rigidly secured to the rear ends of said frame members, respectively, and having ends extending beyond said frame members, and a combined bracing and battery receiving structure rigidly interconnecting said plate and one of said frame members including a vertically disposed and longitudinally extending outer wall rigidly secured to one end of said plate and disposed in transversely outwardly spaced relation to the side wall of said one of said frame members, a transversely extending vertical front wall rigidly interconnecting said outer wall and side wall, and a bottom wall rigidly interconnecting at least said side and outer walls, said walls and plate defining an upward opening battery compartment.

2. The structure set forth in claim 1 wherein said plate is a rear bumper for said vehicle.

3. The structure set forth in claim 2 and further comprising a cover for said battery compartment pivotally connected to said one frame member.

4. In a vehicle of the type having a material handling tool at its front end and an engine near its rear end the combination comprising:

a pair of longitudinally extending and transversely spaced frame members supporting said engine therebetween and having transversely outward facing vertical side walls, respectively, a vertically disposed and transversely extending plate rigidly secured to the rear ends of said frame members, respectively, and extending transversely therebeyond, terminating in substantially vertically disposed ends, combined bracing and battery receiving structures rigidly interconnecting said plate and said frame members including vertically disposed and longitudinally extending outer walls rigidly secured to said vertically disposed ends, respectively, and disposed in transversely outwardly spaced relation to said side walls, respectively, substantially vertical front walls rigidly interconnecting said outer walls, respectively, and said side walls, respectively, and bottom walls rigidly interconnecting at least said side and outer walls, said walls and plate defining a pair of upward opening battery compartments, and cover means for said battery compartments.

5. The structure set forth in claim 4 wherein said plate is a rear bumper for said vehicle.

6. In a vehicle of the type having a pair of rear wheels, a material handling tool at its front end and an engine near its rear end the combination comprising:

a pair of longitudinally extending and transversely spaced frame members supporting said engine therebetween and having transversely outward facing vertical side walls, respectively, a bumper structure rigidly secured to the rear ends of said frame members, respectively, and a battery receiving structure disposed substantially rearwardly of one of said rear wheels including a vertically disposed rear wall extending transversely outwardly from one of said frame members substantially in continuation of said bumper structure, a vertically disposed and longitudinally extending outer wall rigidly secured to said rear wall and disposed in transversely outwardly spaced relation to the side wall of said one of said frame members, a substantially vertical front wall rigidly interconnecting said outer wall and side wall, and a bottom wall rigidly interconnecting at least said side and outer walls, said walls defining an upward opening battery compartment.

References Cited
UNITED STATES PATENTS

| | | | |
|---|---|---|---|
| 1,038,615 | 9/1912 | MacRae | 180—52 X |
| 1,067,256 | 7/1913 | Kennedy | 180—65 |
| 2,700,572 | 1/1955 | Torrance | 296—37.2 |
| 2,876,857 | 3/1959 | Beterstedt | 180—68.5 X |

FOREIGN PATENTS

| | | |
|---|---|---|
| 1,285,557 | 1/1962 | France. |
| 630,876 | 6/1936 | Germany. |
| 182,633 | 7/1922 | Great Britain. |

BENJAMIN HERSH, *Primary Examiner.*

M. L. SMITH, *Examiner.*